United States Patent [19]
Willner

[11] Patent Number: 5,790,103
[45] Date of Patent: Aug. 4, 1998

[54] ERGONOMIC KEYBOARD ENTRY SYSTEM

[76] Inventor: Michael A. Willner, 11521 Potomac Rd., Lorton, Va. 22079

[21] Appl. No.: 538,642

[22] Filed: Oct. 4, 1995

[51] Int. Cl.⁶ .................................................. G09G 5/00
[52] U.S. Cl. ........................... 345/168; 345/172; 341/22; 364/709.12; 364/709.15; 400/477; 400/487
[58] Field of Search ..................... 341/20, 21, 22, 341/23, 27, 28; 345/168, 171, 172; 364/709.12, 709.14, 709.15; 400/477, 487

[56] References Cited

U.S. PATENT DOCUMENTS

| | | | |
|---|---|---|---|
| 3,927,752 | 12/1975 | Jones et al. | 400/487 |
| 3,945,482 | 3/1976 | Einbinder | 400/486 |
| 4,042,777 | 8/1977 | Bequaert et al. | 179/79 |
| 4,270,022 | 5/1981 | Loh | 341/28 |
| 4,519,721 | 5/1985 | Gardner | 400/472 |
| 4,555,193 | 11/1985 | Stone | 400/486 |
| 4,579,470 | 4/1986 | Casey | 40/489 |
| 4,633,227 | 12/1986 | Menn | 341/22 |
| 4,655,621 | 4/1987 | Holden | 400/100 |
| 4,791,408 | 12/1988 | Heusenkveld | 364/189 |
| 4,824,268 | 4/1989 | Diernisse | 400/486 |
| 4,847,799 | 7/1989 | Morita et al. | 364/709.12 |
| 4,911,565 | 3/1990 | Ryan | 400/100 |
| 4,940,346 | 7/1990 | Liljenquist | 400/487 |
| 4,974,183 | 11/1990 | Miller | 364/709.12 |
| 5,003,301 | 3/1991 | Romberg | 345/168 |
| 5,006,001 | 4/1991 | Vulcano | 400/486 |
| 5,017,030 | 5/1991 | Crews | 400/485 |
| 5,059,048 | 10/1991 | Sirkin | 400/486 |
| 5,087,910 | 2/1992 | Guyot-Sionnest | 345/169 |
| 5,184,315 | 2/1993 | Lapeyre | 364/709.16 |
| 5,186,555 | 2/1993 | Chiba | 400/485 |
| 5,197,811 | 3/1993 | Levinrad | 400/489 |
| 5,267,127 | 11/1993 | Pollitt | 361/680 |
| 5,281,966 | 1/1994 | Walsh | 341/22 |
| 5,336,002 | 8/1994 | Russo | 400/489 |
| 5,352,050 | 10/1994 | Choate | 400/486 |
| 5,367,298 | 11/1994 | Axthelm | 341/22 |
| 5,612,691 | 3/1997 | Murmann et al. | 341/22 |

OTHER PUBLICATIONS

R.J. Bamford, et al., "Chord Keyboard with Case Lock and Chord Definition Features", IBM Technical Disclosure Bul. vol. 21, #7, 1978, pp. 2929–2932.

F.C. Bequaert, "Portable High Speed Keyboard", IBM Technical Disclosure Bul., vol. 23, #7A, 1980, pp. 3016–3018.

R.E. Bacon, "Easy-to-Learn Programmable Keyboard", IBM Tech. Disc. Bul., vol. 24, #5, 1981, p. 2465.

"Compact Computer Keyboard", IBM Tech. Discl. Bul., vol. 27, #10A, 1985, pp. 5640–5642.

"Keyboard for Hand Held Computer", IBM Tech. Dis. Bul., vol. 27, #10A, 1985, pp. 5643–5645.

"Typing Keyboard Optimization for Hand–Held Computers", IBM Tech. Discl. Bul., vol. 37, #6B, 1994, pp. 227–229.

"Rectangular Typing Key Layout for Hand–Held Computers", IBM Tech. Discl. Bul., vol. 37, #6B, 1994, p. 357.

*Primary Examiner*—Thomas J. Mullen, Jr.
*Assistant Examiner*—Ashok Mannava
*Attorney, Agent, or Firm*—Rosenberg, Klein & Bilker

[57] ABSTRACT

An ergonomic keyboard entry system (100) is provided. The system (100) includes a base (200) on which is provided a set of first control keys (120) for assigning an output function selected by simultaneously operating one of a plurality of multifunction character keys. In particular, alphabetic character output functions are selected utilizing one of a set of first character keys (220), the particular assignment of alphabetic characters to the particular character keys (222, 224, 226, 228 and 230) being made to provide QWERTY compatibility. Each of the sets of keys (120, 220) are irregularly arranged on the base (200) to be located under the fingertips of a user's bent hands. Further, each of the sets of keys (120, 220) are configured about respective axes (276, 286 and 278, 288), the two axes being disposed at different angles with respect to a horizontal reference, permitting a miniaturized keyboard to be implemented with full size keys.

7 Claims, 9 Drawing Sheets

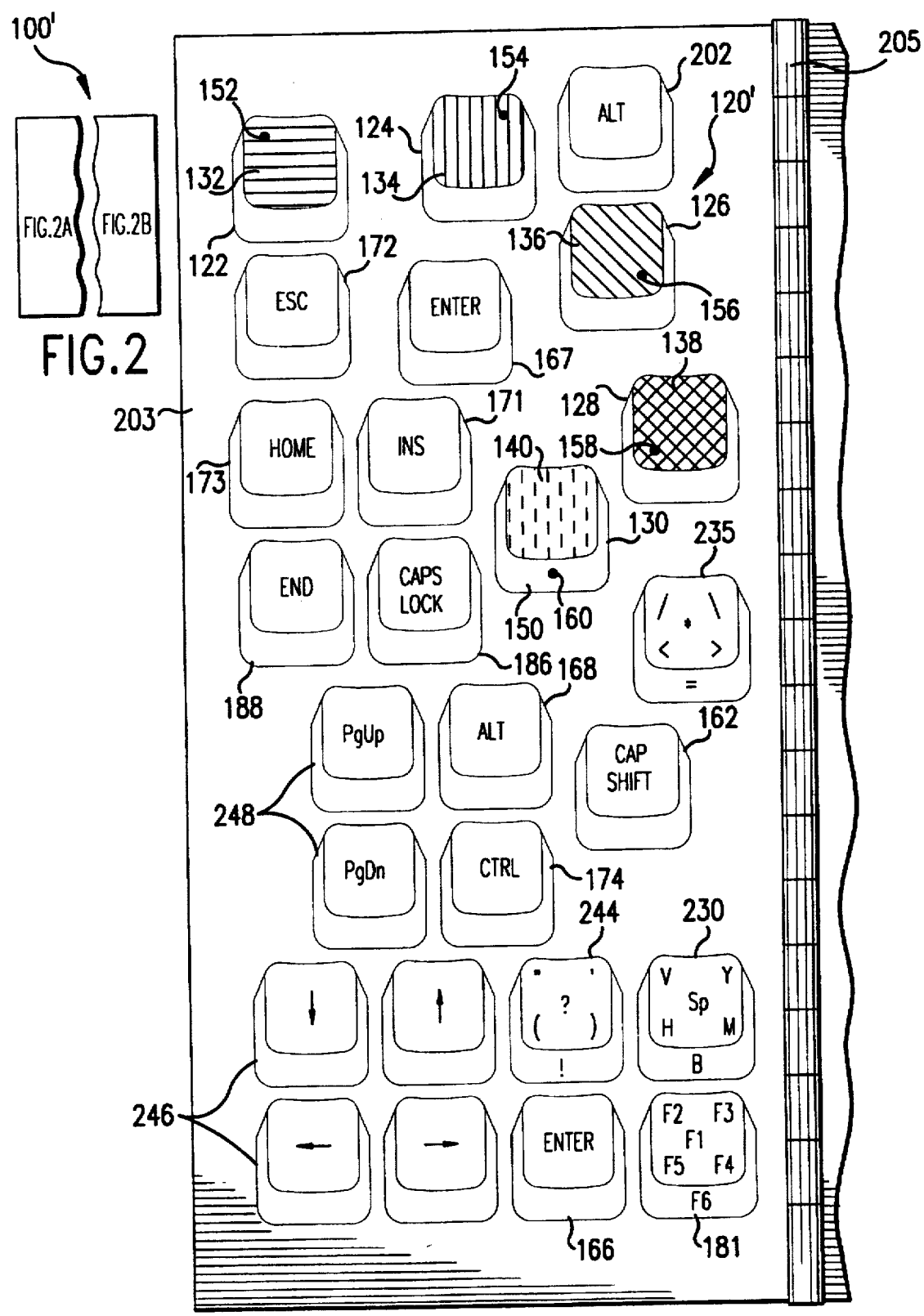

ERGONOMIC KEYBOARD ENTRY SYSTEM

BACKGROUND OF THE INVENTION

1. Field of the Invention

This invention directs itself to keyboard systems, and more particularly to a keyboard entry system for the transfer of information from a human operator to a machine, such as typewriters, computer terminals, and other devices processing linguistic information, in a highly efficient manner. Further, this invention is directed to a particular input keyboard configuration which increases the efficiency of data entry by the assignment of particular characters to particular character keys and the use of a set of multiple control keys. Still further, this invention is directed to a keyboard having a set of control keys which are irregularly arranged on a base to be located under the fingertips of a bent human hand. The invention includes a set of multifunction character keys which are also irregularly arranged to be located under the fingertips of another bent human hand. Additionally, this invention is directed to a keyboard wherein a set of six or less multifunction character keys are used to generate a set of characters representing a complete alphabet.

2. Prior Art

The first typewriter keyboard worked with a plurality of rows of keys, each key being sized to receive a fingertip thereon. All of the keys could be depressed by the outstretched fingers of the hands of the typist in an arrangement about the width of the typist's two hands. All keys were connected to metal rods, having hammer-like ends with character indicia formed thereon as a projection from the hammer surface. When the typist depressed a key, such caused displacement of the hammer to strike paper wrapped about a round rubber tube known as a "platen" through an inked cloth known as a "ribbon", transferring an ink image of the character to the paper. If the typist were quick, it was possible for two or more hammers to hit one another and "jam". This problem was solved in 1872 by C. Latham Sholes with the invention of the QWERTY keyboard, which gets its name from the sequence of the first six characters on an upper row of keys. In order to avoid the mechanical jamming, the keyboard was arranged so that the letters of the alphabet which were most used were located away from the home row of keys, the row where the fingers are normally at rest. This arrangement deliberately slowed down the rate of character generation by causing typists to move their hands a greater distance for the most used characters. Thus, Sholes solved the mechanical interference problem by deliberately creating inefficiency in the human interface. The QWERTY keyboard arrangement, however, became the standard and has been such for well over a hundred years. Although many have devised more efficient keyboards, even keyboards that only require one hand, none have been commercially successful. One of the biggest barriers to the implementation of any of the improvements to the QWERTY keyboard has been the reluctance of keyboard users to give up the "touch system" of typing which they had learned. Having memorized the organization of the QWERTY type keyboard, such users are hesitant to give that up and learn a totally new system.

Of the systems attempting to improve on the QWERTY keyboard, the best prior art known to Applicant includes U.S. Pat. Nos. 5,352,050; 5,197,811; 5,017,030; 5,006,001; 4,847,799; 4,824,268; 4,579,470; 4,555,193; 4,042,777; 3,945,482; 5,367,298; 5,336,002; 5,281,966; 5,267,127; 5,186,555; 5,184,315; 5,087,910; 5,059,048; 5,003,301; 4,974,183; 4,911,565; 4,791,408; 4,655,621; and, 4,519,721, and includes the following publications: R. J. Bamford, et al., "Cord Keyboard with Case Lock and Cord Definition Features", *IBM Technical Disclosure Bulletin*, Vol. 21, No. 7, December 1978, pp. 2929–2932; F. C. Bequaert, "Portable High Speed Keyboard", *IBM Technical Disclosure Bulletin*, Vol., 23, No. 7A, December 1980, pp. 3016–3018; R. E. Bacon, "Easy-to-Learn Programmable Keyboard", *IBM Technical Disclosure Bulletin*, Vol. 24, No. 5, October 1981, p. 2465; "Compact Computer Keyboard", *IBM Technical Disclosure Bulletin*, Vol. 27, No. 10A, March 1985, pp. 5640–5642; "Keyboard for Hand Held Computer", *IBM Technical Disclosure Bulletin*, Vol. 27, No. 10A, March 1985, pp. 5643–5645; "Typing Keyboard Optimization for Hand-Held Computers", *IBM Technical Disclosure Bulletin*, Vol. 37, No. 6B, June 1994, pp. 227–229; and, "Rectangular Typing Key Layout for Hand-Held Computers", *IBM Technical Disclosure Bulletin*, Vol. 37, No. 6B, June 1994, p. 357.

In some prior art systems, such as that disclosed in U.S. Pat. No. 5,006,001, the keyboard is arranged so that one of the user's hands operates four mapping keys which function to change the character assignment of character keys operated by the other hand of the user. However, such prior art systems fail to ergonomically arrange such keys and do not provide for QWERTY compatibility. Still further, such prior art systems organize each group of keys, mapping and character keys, in configurations about respective axes which extend at angles with respect to a horizontal reference which are equal, and in fact substantially orthogonal to the horizontal reference. Further still, such prior art systems require displacement of the user's fingers from home keys to generate a significant number of alphabetic characters.

In still other prior art systems, such as that disclosed in U.S. Pat. Nos. 5,017,030; 4,847,799; 4,824,268; 4,579,470; and, 3,945,482, and the publications of Bacon and Bequaert disclose keyboard systems wherein the keys are ergonomically arranged. The ergonomic arrangement of such keys may further provide a system for entry of alphabetic characters without requiring displacement of the user's fingers from home keys, as disclosed in U.S. Pat. No. 5,017,030. However, none of these systems disclose a character assignment arrangement wherein there is any QWERTY compatibility or systems having six or less multifunction character keys and five or less control or character assignment keys. In fact, many such prior art "chord" type keyboards require simultaneous operation of more than two keys in order to generate some of the alphabetic characters, which becomes difficult for a user to implement efficiently.

In still further prior art systems, such as that disclosed in U.S. Pat. No. 4,555,193, the combination of keys which must be simultaneously operated are color-coded in an attempt to make selection of the characters evident to the user from the face of the keyboard. However, the repeated use of the same colors and the arrangement of the keys makes character selection confusing rather than self-evident from viewing the keyboard. Additionally such prior art systems fail to disclose the use of character position indicia to identify the combination of keys to be operated by the user to obtain a particular character output function. Further still, such prior art systems require two keys from the same field to be concurrently actuated to generate a particular character. Moreover, such prior art systems require keys to function as both character keys and control keys, making it difficult to decipher when a key is used for what function and thereby causing significant confusion for the user.

SUMMARY OF THE INVENTION

An ergonomic keyboard entry system is provided. The ergonomic keyboard entry system includes a longitudinally extended base. The ergonomic keyboard entry system further includes a plurality of multifunction character keys coupled to the base. The plurality of multifunction character keys includes a set of six or less multifunction character keys. Five of the set of first multifunction character keys being irregularly arranged on the base to be located under fingertips of a first bent human hand. The irregular arrangement of the five first multifunction character keys being disposed about a first axis extending at a predetermined angle with respect to the longitudinal direction. Each of the set of first multifunction character keys is operative to generate alphabetic character output functions. The ergonomic keyboard entry system also includes a plurality of control keys coupled to the base. The plurality of control keys including a set of five or less first control keys irregularly arranged on the base to be located under fingertips of a second bent human hand. An irregular arrangement of the set of first control keys are disposed about a second axis extending at a second predetermined angle with respect to the longitudinal direction. Each of the set of first control keys is operative to generate a predetermined assignment of output functions to the plurality of multifunction character keys.

It is therefore a feature of the invention to provide a keyboard of compact size utilizing full size keys.

It is another feature of the invention to provide a keyboard having an arrangement of keys and character assignments which maximizes data entry speed and typing efficiency.

It is a further feature of the invention to provide a keyboard having an arrangement of keys clustered in an ergonomic pattern, and the clusters angled to minimize space.

It is a still further feature of the invention to provide a keyboard that minimizes finger flexing and the stress on the user's body associated therewith.

It is a further feature of the invention to provide a keyboard having a character assignment which is sufficiently compatible with the QWERTY arrangement to be easy to learn.

It is a still further feature of the invention to provide a keyboard having an assignment of alphabetic characters defining a complete alphabet to no more than six keys.

It is another feature of the invention to provide a keyboard that allows the user to generate all the letters of the alphabet without the user's fingers moving from the home character keys, thereby increasing the speed and comfort with which the user can enter information.

It is a further feature of the invention to provide a QWERTY compatible character assignment to a minimum number of multifunction character keys that is applicable for use on one-handed type keyboards.

It is yet another feature of the invention to provide a keyboard having control keys with identifying indicia, markings and/or color, to provide visual indications of the characters associated with each control key, thereby making the requisite key combination to generate a particular character unambiguously suggested by the keyboard itself.

These and other advantages and novel features of the invention will become apparent from the following detailed description when considered in connection with the accompanying drawings wherein:

BRIEF DESCRIPTION OF THE DRAWINGS

FIG. 2 is a block diagram showing how FIG. 2A and FIG. 2B should be viewed together to visualize another embodiment of the present invention;

FIG. 2A is a perspective view of one portion of another embodiment of the present invention;

DESCRIPTION OF THE PREFERRED EMBODIMENTS

Referring to FIGS. 1–5, there is shown ergonomic keyboard entry system 100 for providing character output functions to a display or printing system as embodied in data terminals, personal computers, and modern typewriter systems. As will be seen in following paragraphs, ergonomic keyboard entry system 100 is specifically directed to the concept of embodying an alphabetic character set in a minimum number of multifunction character keys for operation by one hand of a user, with each key being operative to generate selected alphabetic character output functions. System 100 further includes a plurality of control keys operative by the other hand of the user and operative to define the selected alphabetic character output function when a selected one of the control keys is operated simultaneous with a particular multifunction character key. Through the use of a set of multifunction character keys which embody all of the characters representing a complete alphabet, less keys are required to implement the keyboard functions normally associated with electronic data processing equipment. Thus, it is possible to implement miniaturized processing equipment, such as lap-top and hand-held computers with keyboards having full size keys. Another advantage of system 100 and the reduced number of keyboard keys provided thereby, is the ability to increase the data entry rate of a user by reducing the distance the user's fingers need to travel in order to enter text data. Although the keyboard layout of system 100 is radically different from that of QWERTY keyboards, the appropriate manipulation of the keys to provide the desired alphabetic character output functions is easy to learn by virtue of the QWERTY compatibility achieved by the particular character assignments made to the keyboard keys.

Figure 1:
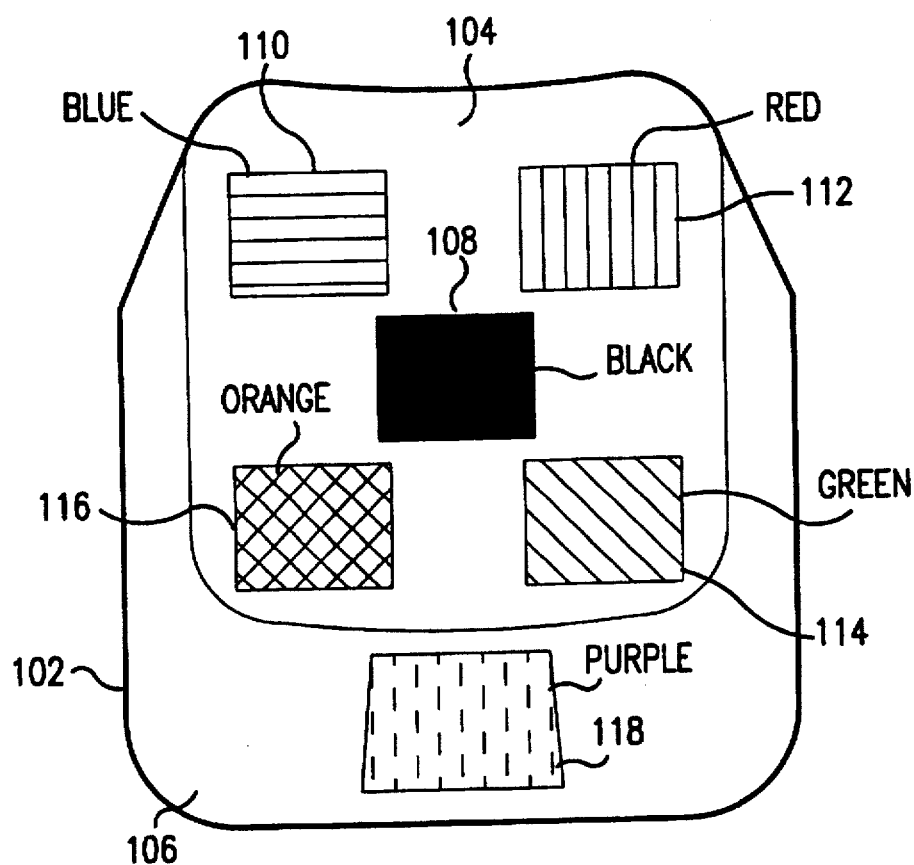
FIG. 1 is a perspective view of a character key of the present invention.

In order to understand the character output functions which are identified on each key, reference is now made to FIG. 1, wherein a typical character key 102 is shown. The character keyboard key 102 has an upper face 104 where a plurality of character indicia regions or locations 108, 110, 112, 114, and 116 may be disposed. Character key 102 further includes a frontal face 106 which may bear an additional character indicia location 118. The first character indicia location 108 is indicated as having a black color, and thus any character which is positionally located centrally on an upper face of a character key would be imprinted in black. Further, any character disposed within the first character indicia location 108 represents a default output function, an output function which is generated without a requirement for the simultaneous operation of any of a first set of control keys. The particular character identified in the first character indicia location 108 may be output in a different form, however, such as in upper case, when the appropriate other control keys are operated, such as when the CAPS SHIFT or CAPS LOCK control keys are operated. The second character indicia location 110 is identified with a blue color, and thus any character disposed on the upper left corner region of the upper face 104 will be imprinted in a blue color. Similarly, a character located in the third character indicia location 112, positioned in the upper right corner of the upper face 104 of key 102, is indicated as having a red color. A character which is disposed in the fourth character indicia area 114, located in the lower left corner of the upper face 104 of key 102, will have a green color for identification. Likewise, a character disposed within the fifth character indicia location 116, disposed in the lower left corner of the upper face 104 of key 102, will have an orange color associated therewith. In those embodiments wherein six character output functions are associated with a single key, the sixth character will be disposed in the sixth character indicia location 118 disposed on the front face 106 of key 102 and is indicated as having a purple color associated therewith. It should be understood that the colors identified herein with the character indicia locations 108, 110, 112, 114, 116 and 118 are exemplary only, the specific colors not being important to the inventive concept. Any color may be utilized to associate a particular control key with the character output function identified in a particular character indicia location, in fact, other indicia can be used to associate the control key with particular character indicia locations.

Figure 1A:
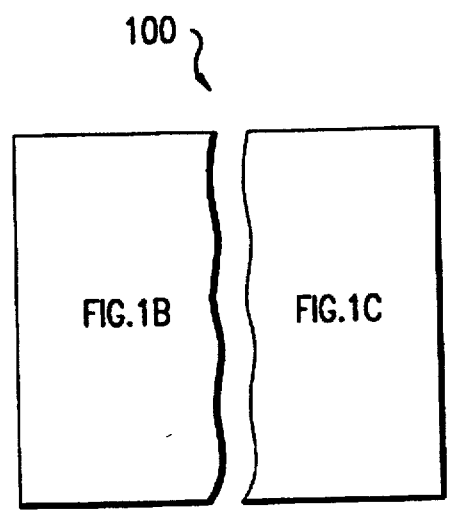
FIG. 1A is a block diagram showing how the FIGS. 1B and 1C should be oriented to visualize the present invention.
Figure 1B:
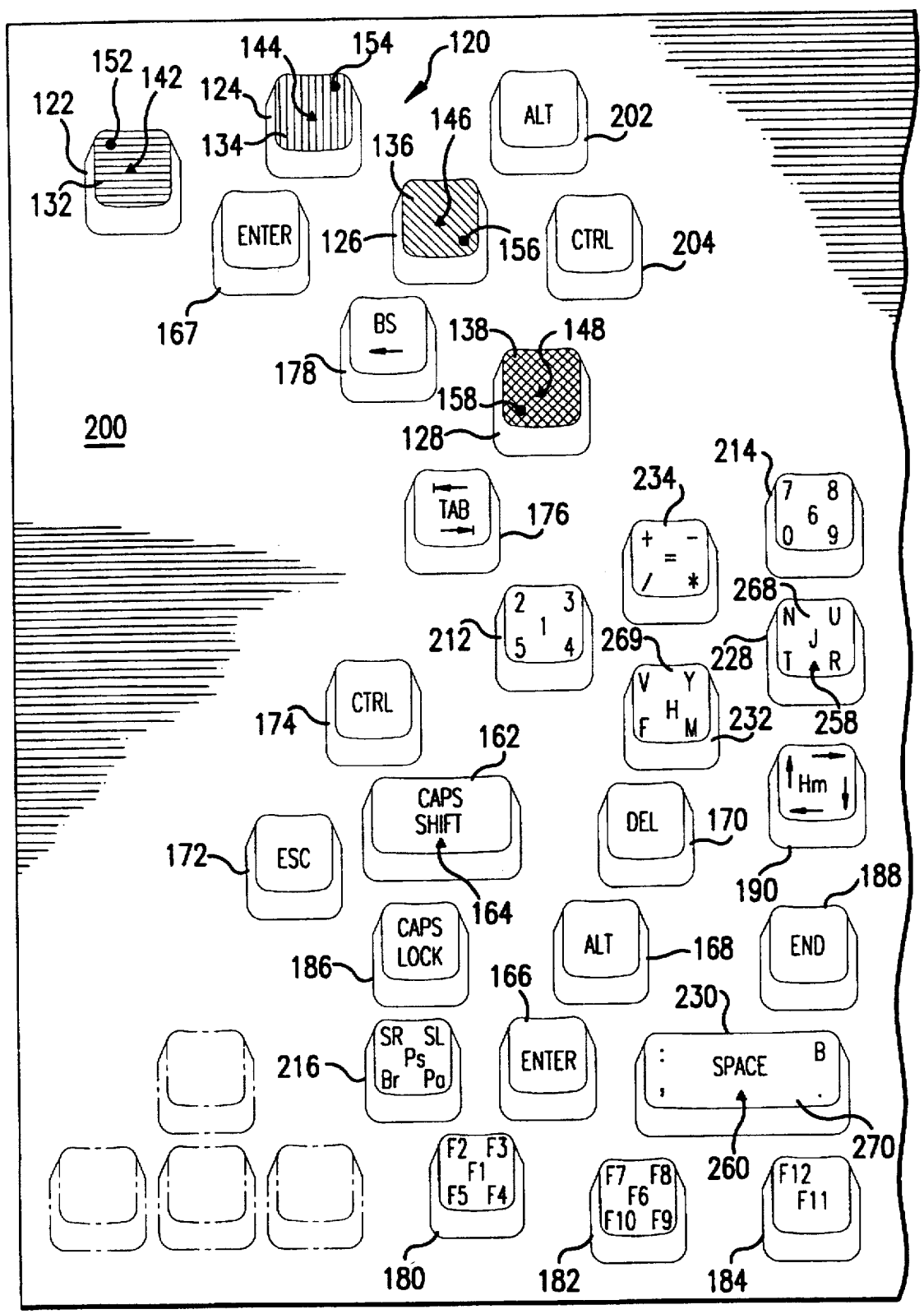
FIG. 1B is a perspective view of one portion of the keyboard entry system.
Figure 1C:
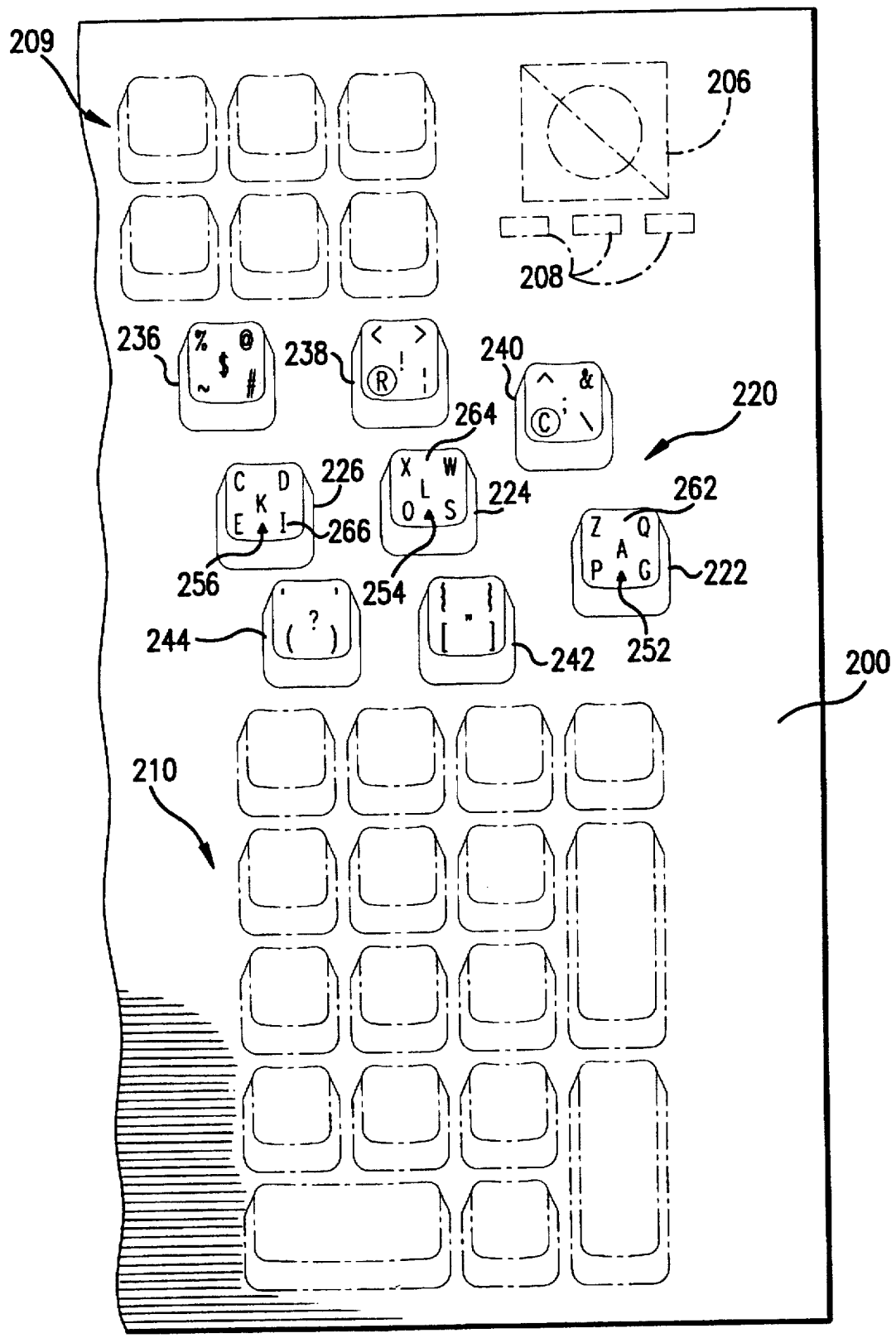
FIG. 1C is a perspective view of another portion of the keyboard entry system.

The ergonomic keyboard entry system 100 is shown in FIGS. 1B and 1C, as indicated in FIG. 1A. The ergonomic keyboard entry system 100 shown in FIGS. 1B and 1C represents a keyboard for a lap-top or notebook type computer, or personal digital assistant (PDA) (not shown to scale) wherein a plurality of keyboard keys are coupled to a base 200. Base 200 may be integrated into the housing of the computer or PDA, or may be a separately detachable structure. System 100 is intended to be operated by both hands of a user, one hand being disposed on the left hand side of the base 200 and the other hand on the right side thereof. Although particular sets of keys will be identified as being associated with a user's left hand, and other keys associated with a user's right hand, it should be understood that such could be reversed without departing from the spirit or scope of the invention, as it is not important to the inventive concept as to which hand of a user operates any particular set of keys. A set of first control keys 120 includes the blue control key 122, the red control key 124, the green control key 126 and the orange control key 128, each of these control keys having a respective upper face 132, 134, 136 and 138 marked in the respective color. Each of these control keys further has a respective position identifier, or marking, 152, 154, 156 and 158 whose function will be fully explained in following paragraphs.

When a user prepares to enter data utilizing system 100, the user's fingers are placed over specific keys, hereinafter referred to as home keys, which are to be distinguished from the HOME cursor function keys typically found on computer-type keyboards. The home keys of system 100 are identified by a triangularly shaped marking 142 on key 122, 144 on key 124, 146 on key 126, 148 on key 128 and 164 on key 162 for the left hand of the user. The home control keys may be identified by other markings or distinguishing features, such as raised nubs. The set of first control keys and the CAPS SHIFT key 162 are irregularly arranged on the base 200 to be located under the fingertips of the user's hand, when such is bent or flexed in preparation for operating keyboard keys. The relative locations of each of keys 122, 124, 126, 128 and 162 have been particularly chosen to correspond to that of an average bent human hand. Obviously, the relative locations of keys could be customized to correspond to a specific hand size or in the alternative, different keyboards may be provided with the locations of keys adapted for different sizes of hands, i.e. small, medium and large. As will be discussed in following paragraphs, the grouping of control keys 120 are configured so that the user's arm will extend along an axis line having a predetermined angle with respect to a horizontal reference axis.

The control keys 122, 124, 126, 128 and 162 are utilized in cooperation with a plurality of multifunction character keys, function keys and special control keys, all coupled to the base 200. Of particular importance, is the set of first character keys 222, 224, 226, 228, 230, and 232 that provide alphabetic character output functions defining a set of characters representing a complete alphabet. Although the character sets shown and described herein are only that of the English language, it should be clear that alphabets of other languages could be substituted therefor. Here again, home keys are identified by a triangularly shaped marking 252, 254, 256, 258, and 260 to indicate the initial positioning of the user's right hand. In the alternative, these home keys may be identified by other indicia, such as other symbols, raised nubs, and raised or embossed characters. Thus, when the user prepares to enter data, the user's left hand will be disposed such that the little, or fifth finger, is on key 122, the ring, or fourth finger, will be on key 124, the middle, or third finger, will be on key 126, the index, or second finger, will be on key 128, and the thumb, or first finger, will be on key 162. With respect to the user's right hand, the little, or fifth finger, will be on key 222, the ring, or fourth finger, will be on key 224, the middle, or third finger, will be on key 226, the index, or second finger, will be on key 228, and the thumb, or first finger, will be on key 230.

Figure 1D:
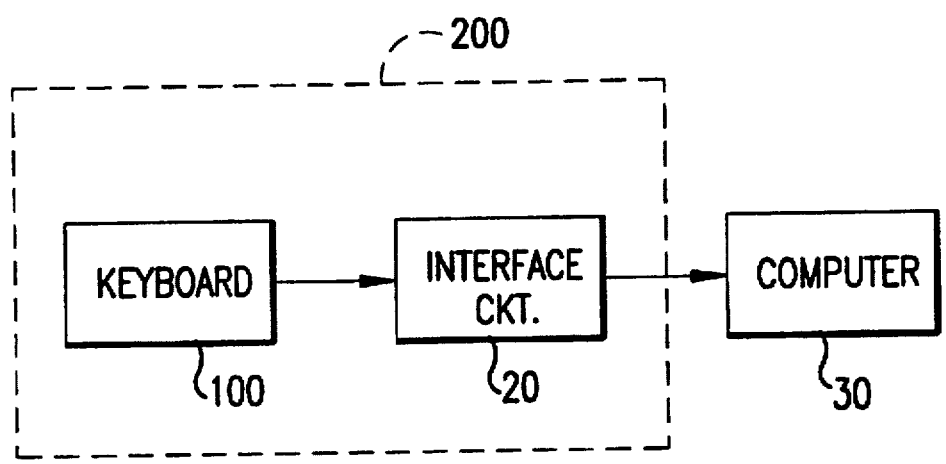
FIG. 1D is an electrical block diagram of the keyboard entry system.

As previously stated, the default character output function is identified by the indicia disposed centrally in the respective upper face 262, 264, 266, 268, 269 and 270 of the respective character keys which form the character key set 220. Thus, when the key 222 is depressed, without depression of any of the colored control keys 122, 124, 126 and 128, the digital code for the alphabetic character "a" is generated by the keyboard circuitry for transmission to a utilization device such as a computer. As shown in FIG. 1D, the keyboard system 100 is coupled to the computer 30 through an interface circuit 20, which may be installed within the base 200. Interface circuit 20 is coupled to the plurality of keyboard keys which form system 100 for receiving switch closure signals therefrom. Interface circuit 20 converts the switch closure signals, or combinations thereof, into multi-digit "words" compatible with the particular computer system 30 to which system 100 is being coupled. Interface circuit 20 also establishes timing windows for establishing when multiple keys are operated substantially simultaneously. As it is unlikely that keys will be operated at exactly the same time, circuit 20 establishes a predetermined time period in which sequential operation of multiple keys will be interpreted as having been intended to be simultaneous, without regard to which key was operated first. Such interface circuits are well known in the art, and are therefore not further described herein. Hereinafter, whenever a character key is referred to as generating a character, it should be understood that such generates a digital representation of the character, as is also true for the non-alphabetic output functions.

When it is desired to output a character other than one identified as a default character, a particular one of the colored control keys 122, 124, 126, 128 is depressed prior to or simultaneous with the appropriate character key 122, 124, 126, 128, 130, 132. Although a colored control key could be depressed and held until the character key is depressed, the highest typing speed will be achieved when both are depressed substantially simultaneously. To illustrate the operation of system 100, the following example is provided. If the user wished to enter the word "base", the user would momentarily simultaneously depress the red control key 124 with the fourth finger of the left hand and character key 230 with the thumb of the right; followed by momentary depression of the character key 222 with the fifth finger of the right hand; then momentarily depressing the green control key 126 with the third finger of the left hand and character key 224 with the fourth finger of the right hand; followed by momentary depression of the orange control key 128 with the index finger of the left hand and the character key 226 with the third finger of the right hand. It should now become apparent that the characters which represent the entire alphabet can be generated utilizing the six character keys 222, 224, 226, 228, 230 and 232, five of which are home keys. Thus, only the alphabetic characters shown on the face 269 of key 232 require displacement of the user's finger from the home key 228 to be generated, twenty-one of the twenty-six alphabetic characters requiring no displacement of the user's fingers from the home keys. Obviously, such minimal finger movement can mean a tremendous increase in typing or keyboarding speed. By this arrangement, each of the multifunction character keys 222, 224, 226, 228, 230 and 232 are operative to generate any one of a plurality of character output functions, the particular character output function being assigned by operation of the control keys 122, 124, 126, 128 and 162, the control key 162 changing the form of the character, from lower case to upper case.

An important feature of system 100 is its QWERTY compatibility, with respect to alphabetic characters, making it exceptionally easy to learn. In the touch-typing system, particular fingers of each hand are utilized to generate particular alphabetic characters, such as the middle finger of the left hand which in a QWERTY system operates the keys which generate the characters "d", "e" and "c", while the middle finger of the right hand is utilized to operate the "i" and "k" keys. In system 100, shown in FIG. 1C, the middle finger of the user's hand operates the key 226, which can generate the characters "k", "c", "d", "e", and "i", the same characters generated by the middle fingers of the user's hands in a QWERTY system. As shown in Table 1 and FIGS. 1B and 1C, only the characters "g" and "b" do not correspond to the touch-typing arrangement for the QWERTY unique assignment of characters to the 222, 224, 226, 228, 232 and 230 provides advantages to the use of system 100.

TABLE 1

| | | Control key | | | |
|---|---|---|---|---|---|
| CHAR. KEY | NONE | #1 BL | #2 RED | #3 GR | #4 OR |
| 230 | SPACE | : | B | . | , |
| 228 | J | N | U | R | T |
| 226 | K | C | D | I | E |
| 224 | L | X | W | S | O |
| 222 | A | Z | Q | G | P |
| 232 | H | V | Y | F | M |

The unique key assignment of this embodiment and others that follow which provide QWERTY compatibility, as defined herein is also applicable to one-handed keyboards, those designed to be operated by only one of the user's hands. In such a one-handed system, the user's four fingers would operate the multifunction character keys and the user's thumb would operate the colored control keys. This arrangement could be reversed as well, as the important feature is the particular character assignments to the multifunction character keys to provide QWERTY compatibility. In such an arrangement where the thumb operates the control keys, the CAP SHIFT key would be located in close proximity thereto for simultaneous operation therewith. The CAP SHIFT key may therefore be located centrally with respect to a cluster of colored control keys surrounding the CAP SHIFT key.

System 100, in addition to color, identifies the association of control keys with the character indicia locations through the use of a position identifier 152, 154, 156 and 158. The identifier, while shown as a dot, may be in the form of any symbology, either imprinted or formed as a projection and either utilized in combination with the colored upper faces 132, 134, 136 and 138, or independently thereof. As shown, the identifying mark 152 is disposed in the upper left corner of the upper face 132 of key 122, indicating that depression of key 122 will assign the character indicia correspondingly located in the upper left corner of the upper face of a simultaneously depressed character key. Likewise, the position identifiers 154, 156 and 158 are located so as to correspond to the respective character indicia locations on the plurality of character keys to identify the particular character being assigned for generation by that character key when it is operated simultaneously with the respective control key. The position identifiers 152, 154, 156 and 158 may be in the form of a projection extending from the upper face of the key, providing a tactile cue of the character indicia position associated therewith. Another tactile indication is simply the position of the particular control key 122, 124, 126 or 128. As control key 122 is associated with character indicia location 110 and each of the other control keys in clockwise sequence is associated with a corresponding character indicia location in clockwise sequence, the operation of the keyboard is easy to learn.

In addition to the set of first character keys 220, system 100 includes a plurality of other multifunction character keys 234, 236, 238, 240, 242 and 244 for generating predetermined symbols and punctuation and the keys 212 and 214 for generating numeric characters. The colored control keys 122, 124, 126 and 128 may further be utilized with function keys 180, 182 and 184 typically utilized with personal computer systems, as well as cursor position control key 190. The set of control keys 120 may also be used with the special function key 216 to output PRINT SCREEN, SCROLL LOCK, PAUSE, BREAK, and SYS- TEM REQUIREMENTS functions. In addition to the multifunction character keys, system 100 may include single function keys such as the END key 188, DELETE key 170, ALT keys 168, 202, ENTER keys 166, 167, ESCAPE key 172, CONTROL keys 174, 204, TAB key 176 and BACKSPACE key 178. In addition to the first set of control keys 120, system 100 may include other control keys, such as the CAPS LOCK key 186, or additional SHIFT keys disposed in proximity of the user's right hand, in one of the optional key position spaces 209. As system 100 requires so few keys to implement a fully configured computer-type keyboard, system 100 may additionally include a calculator-type set of keys 210 having numeric and mathematical function keys associated therewith. Further, indicator lamps 208 and track ball 206 may be provided to meet the human interface requirements of a particular computer to which the system 100 is connected.

The embodiment of system 100 shown in FIGS. 1A, 1B and 1C is particularly configured to permit full size keys to be utilized with systems requiring a keyboard to occupy a significantly reduced space, as compared to the size of keyboards for conventional personal computer systems. This is accomplished in several ways. First, the character keys are multifunction, they are used to generate more than one character, implementing an entire alphabet in six character keys or less. Next, the set of colored control keys 120 are vertically displaced with respect to the set of first character keys 220. Further, to achieve a more compact arrangement, the set of control keys 120 can be irregularly arranged so that the user's arm will extend along an axis line which is directed at a greater angle than an axis line established by the set of first character keys.

As will be discussed further, the set of first character keys 220 are arranged such that the user's arm will extend along an axis line which is angled at approximately 60° with respect to a horizontal reference. Whereas the user's other arm will extend along an axis line which is angled at approximately 135° with respect to a horizontal reference when size must be minimized. Thus, by locating the set of first control keys 122, 124, 126, 128 and 162 in vertically displaced relationship with respect to the set of first character keys, and oriented to place the user's arm at a greater angle than the user's other arm, and utilizing character keys for output of any of five different character assignments, a very compact keyboard arrangement can be provided.

Figure 2B:
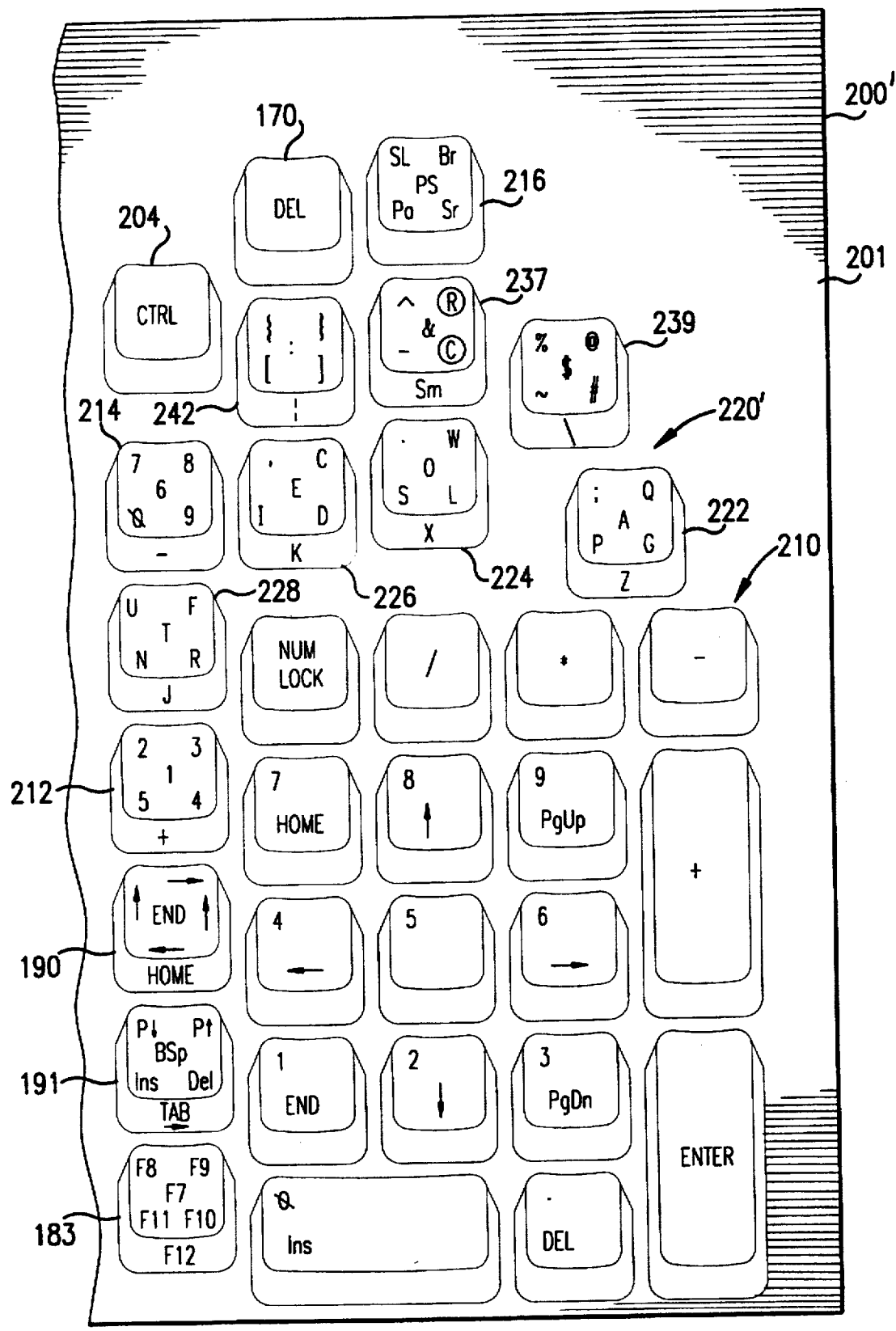
FIG. 2B is a perspective view of another portion of the other embodiment of the present invention.

Referring now to FIGS. 2, 2A and 2B, such shows another embodiment of the ergonomic keyboard entry system. System 100' adds an additional character output function to the set of first character keys 220'. Thus, an additional advantage of system 100' is that all of the alphabetic characters can be generated without displacement of the user's fingers from any of the home keys. This further reduction in the number of keys required to generate the necessary keyboard entry functions permits full size keys to be utilized with miniaturized, hand-held, computers. As shown in FIGS. 2A and 2B, the keyboard base 200' is defined by a respective first half 201 and second half 203 pivotedly coupled together by the hinge 205, allowing the keyboard to be folded and thereby occupy less space. Although the base 200' is depicted as having a vertically directed hinge to divide the keyboard into left and right halves, the hinge 205 may be oriented horizontally to divide the base 200' into upper and lower halves, with appropriate spacing of the keys above and below the hinge location.

As shown in FIG. 2A, system 100' includes a set of first control keys 120' defined by the colored control keys 122, 124, 126, 128 and 130, with keys 122, 124, 126, 128 and 162 being a home key upon which the user places each of the fingers of one hand. In the particular example being illustrated in the Figure, the user's left hand operates the colored control keys. Control key 122 includes an upper face 132 having a blue color marking thereon, while the control key 124 includes an upper face 134 having a red marking. Control key 126 is provided with a green colored upper face 136 and the control key 128 may have an upper face 138 with an orange coloring thereon. The fifth control key 130 is provided with an upper face 140 having a purple marking thereon. Each of the control keys 122, 124, 126 and 128 are operated by the user's fingers, as previously described relative to FIG. 1B. Control key 130 may be operated by the user's left index finger, moving it from the home key 128, to generate the least used alphabetic characters on the key. Alternately, a user may choose to use control key 130 as the home key for initial placement of the thumb and operate the CAP SHIFT key with some other finger or by moving the thumb from the home key. In addition to these control keys having colored upper faces to identify the character indicia generated responsive to operation of each control key with a particular character key, each control key includes a respective position identifier 152, 154, 156, 158 and 160 which corresponds to a respective character indicia location. In the case of character key 130, its position identifier 160 is disposed on the key's front face 150, indicating that the character whose indicia is disposed on the front face of a respective character key will be generated when such character key and the control key 130 are simultaneously operated.

Ergonomic keyboard entry system 100' includes a set of first character keys 220' comprising five character keys 222, 224, 226, 228 and 230, as shown in FIGS. 2A and 2B. Each of these multifunction character keys defines a home key position upon which the user places the fingers of a respective hand, in the example shown, the user's right hand. With each of keys 222, 224, 226, 228 and 230 being capable of generating any of six characters, all of the alphabetic characters which define a complete alphabet can be generated by those keys. In addition to the alphabetic characters, character key 222 also is capable of generating a semi-colon, character key 224 generates a period, character key 226 generates a comma and character key 230 generates a space. Thus, for the great majority of text input the user need not move his or her fingers from the home keys, other than to shift between lower and upper case. This arrangement provides a great speed advantage over QWERTY or other keyboard arrangements.

It is also important that any new keyboard arrangement be easy to learn, as most individuals utilizing a keyboard will previously have learned to touch type on the QWERTY system. System 100', although capable of generating text input at a much higher rate of speed than possible with the QWERTY keyboard, is compatible therewith. System 100' provides QWERTY compatibility in that twenty of the twenty-six characters of the English alphabet are operated by a corresponding finger. That is, if one looks at all of the alphabetic characters operated by the fifth finger of the left hand in a touch typing system of a QWERTY keyboard, such include the letters "a", "q" and "z", while the fifth finger of the right hand additionally is used to produce the letter "p". As shown in Table 2 and FIGS. 2A and 2B, all of those characters ("a", "q", "z", "p") are operated by the user's fifth finger of one hand, operating the key 222. Additionally, the ";" which in a QWERTY system is generated utilizing the fifth finger of the right hand, is also generated utilizing key 222. In addition to the compatibility of the alphabetic characters, there is compatibility with respect to the most commonly used punctuation marks (";", ".", ",") and the space. Thus, it can be seen that the particular selection of characters for each of the keys of system 100' provides unique advantages to users thereof.

TABLE 2

| | | Control key | | | | |
|---|---|---|---|---|---|---|
| CHAR. KEY | NONE | #1 BL | #2 RED | #3 GR | #4 OR | #5 PURPLE |
| 230 | SPACE | V | Y | M | H | B |
| 228 | T | U | F | N | R | J |
| 226 | E | , | C | D | I | K |
| 224 | O | . | W | L | S | X |
| 222 | A | ; | Q | G | P | Z |

In addition to the set of first character keys 220', system 100' includes a pair of numeric multifunction keys 212 and 214 as well as a full calculator key set 210. Further, character keys 235, 237, 239, 242, and 244 are provided for other symbology. System 100' includes computer function entry keys 181 and 183 as well as the computer function keys of ESCAPE 172, ALT 168, 202, CONTROL 174, 204, ENTER 166, 167, INSERT 171, and DELETE 170, the latter two also being included in the MULTIFUNCTION key 191. Cursor positioning is provided by a group of keys 246, as well as the MULTIFUNCTION key 190, the PAGE DISPLACEMENT keys 248 and the HOME and END keys 173 and 188, respectively. In addition to the set of colored control keys 120', system 100' includes the CAPS LOCK key 186 and the CAP SHIFT key 162 control keys, as would be expected. This description is not meant to be limiting, as non-home keys may be located in other positions on the keyboard and other control, character and function keys may be added without departing from the spirit or scope of the instant invention.

One of the means by which system 100' provides a keyboard of compact size, while still maintaining standard size keys is by the location and arrangement of the sets of home keys 120', 220'. Each of the sets of home keys 120', 220' are irregularly arranged to be located under the fingertips of a respective bent human hand. Each of the sets of home keys 120', 220' are also arranged such that the user's arm will extend along an axis line oriented at a predetermined angle with respect to a horizontal reference line, which can best be seen in FIG. 4.

Figure 4:
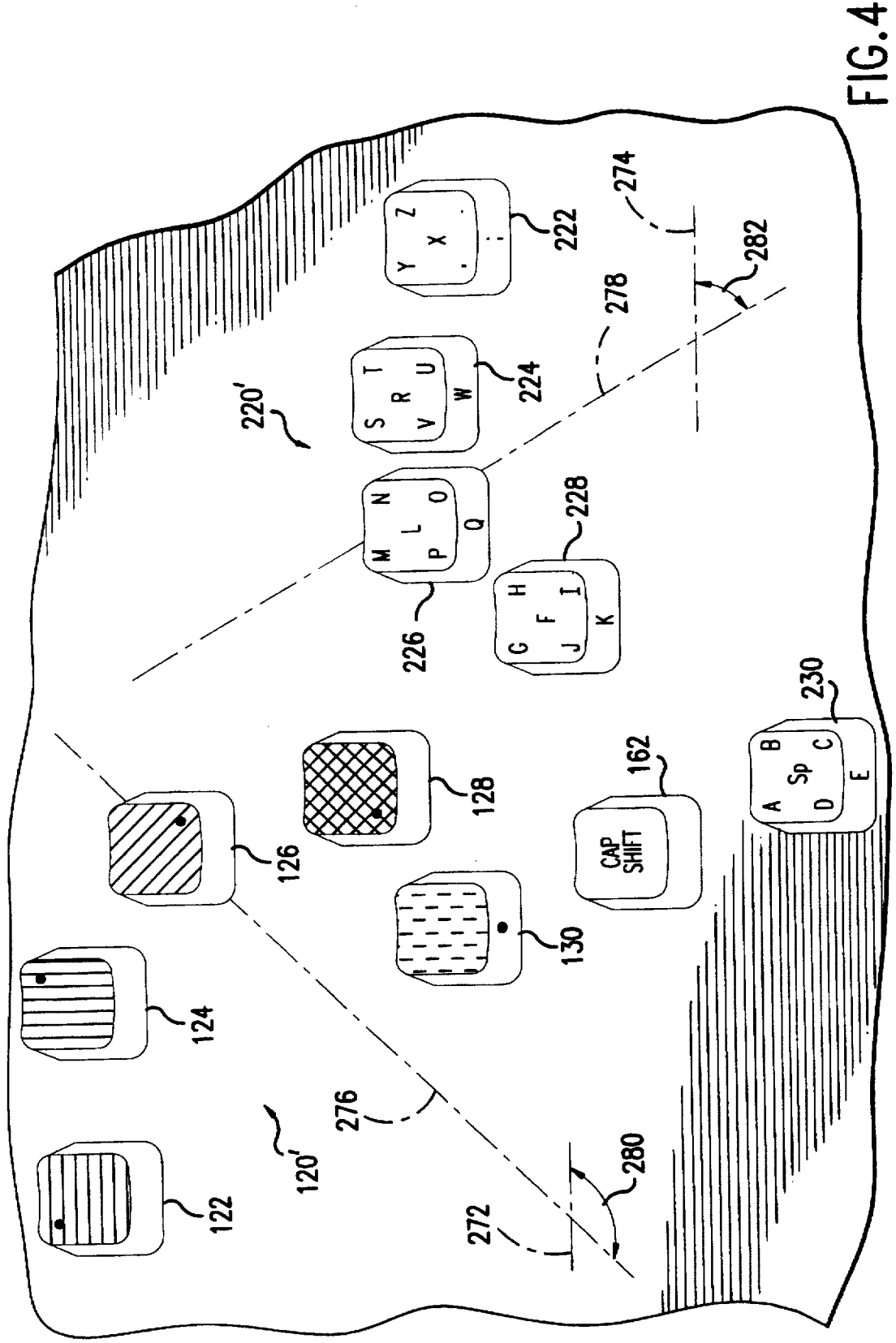
FIG. 4 is a perspective view depicting the positional relationship of a set of control keys with respect to a set of character keys for one embodiment of the present invention; and, FIG. 5 is a perspective view depicting the positional relationship of a set of control keys with respect to a set of character keys for another embodiment of the present invention.

As shown in FIG. 4, the set of control keys 120' and CAP SHIFT key 162 are clustered about the axis line 276 which extends at an angle identified by the directional arrow 280 with respect to the horizontal reference line 272. This angle will approximate 135° where keyboard size must be minimized and is the angle at which the user's arm will extend, the axis line 276 thereby representing an axis of the user's arm. With only a slight sacrifice in size, the angle represented by directional arrow 280 may be 120°, which is the complement of axis 278. The set of character keys 220' are clustered about an axis line 278. The axis line 278 extends at a predetermined angle indicated by the directional arrow 282, with respect to the horizontal reference line 274. The angle of axis line 278 with respect to horizontal reference 274 approximates 60° and is the axis of the user's other arm. Thus, for the most compact system, the user's arms extend along axis lines which are different and not complements of one another. It should be further noted that the cluster of keys about axis line 276, defined by control keys 120' and CAP SHIFT key 162, are vertically displaced with respect to the cluster of character keys 220'. The displacement of that grouping of keys with respect to the cluster of character keys 220' further contributes to the achievement of a smaller keyboard size, while maintaining the size of the individual keys the same as that found in a standard full-size keyboard, irrespective of whether axis line is directed at 120° or 135°.

Also illustrated in FIG. 4, is an alternate character assignment for the set of first character keys 220'. Although it is believed that QWERTY compatibility is a distinct advantage to users of keyboard entry systems previously described, some individuals may prefer a sequential alphabetic arrangement since the user's fingers, for all practical purposes, never have to be displaced from the home keys when entering text. The particular character assignment is defined in Table 3 and shown in FIG. 4. In this particular arrangement each key, beginning with the thumb operated key 230 is used to generate sequential characters of the alphabet, the key 230 being utilized for the alphabetic characters "a" through "e", key 228 for characters "f" through "k", key 226 for the characters "l" through "q", key 224 for the characters "s" through "w", and key 222 for the characters "x" through "z" and punctuation.

TABLE 3

| | | Control key | | | | |
|---|---|---|---|---|---|---|
| CHAR. KEY | NONE | #1 BL | #2 RED | #3 GR | #4 OR | #5 PURPLE |
| 230 | SPACE | A | B | C | D | E |
| 228 | F | G | H | I | J | K |
| 226 | L | M | N | O | P | Q |
| 224 | R | S | T | U | V | W |
| 222 | X | Y | Z | . | , | ; |

Figure 3:
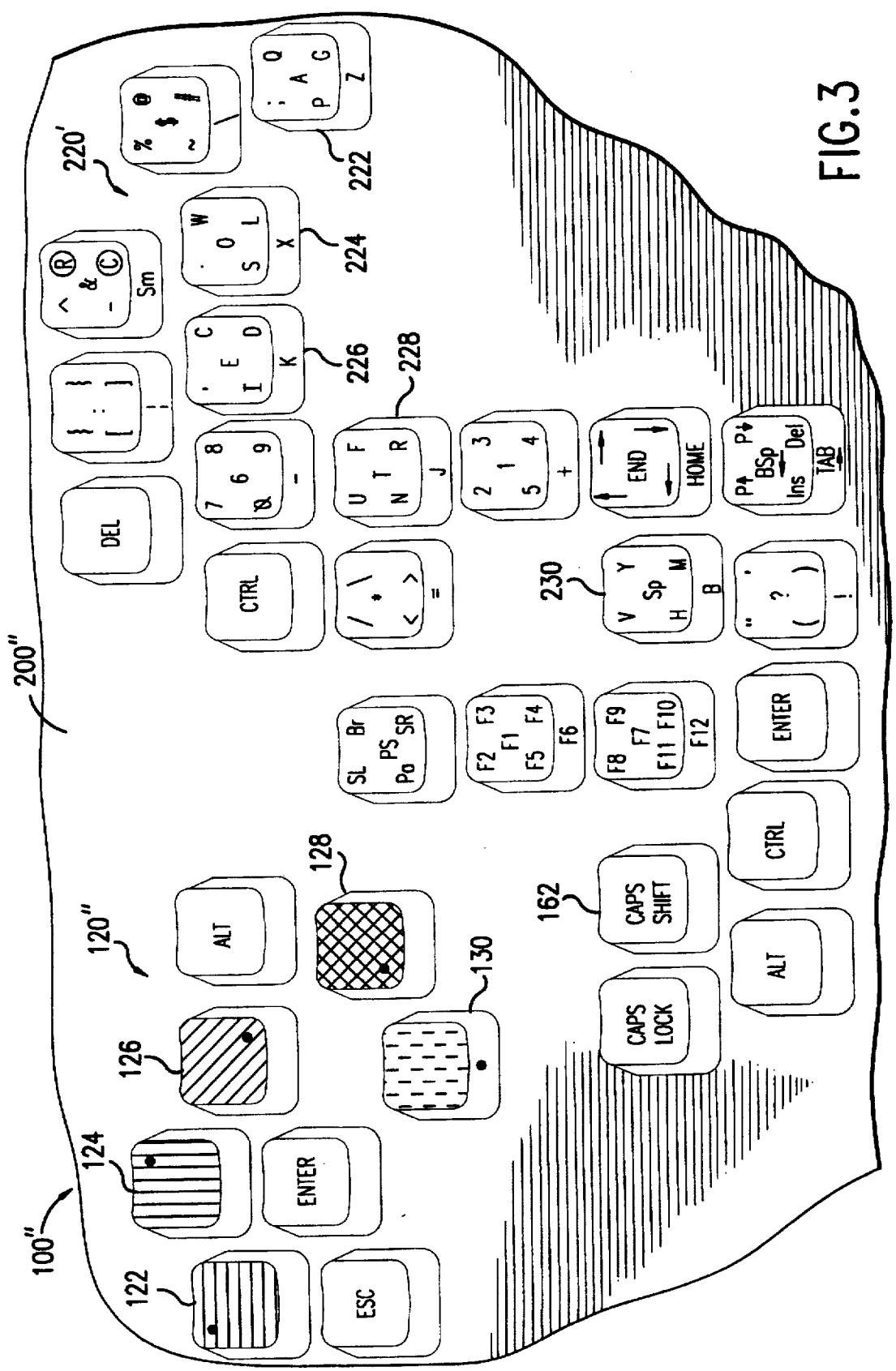
FIG. 3 is a cut-away perspective view of yet another embodiment of the present invention.

Referring now to FIG. 3, there is shown, another embodiment of the ergonomic keyboard entry system. The ergonomic keyboard entry system 100" is directed to a standard size keyboard having a base 200" with the keys 122, 124, 126 and 128 of the set of first control keys 120" and the CAP SHIFT key 162 being positioned so as to be located under the fingertips of one of the user's bent hands, while the set of first character keys 220' are arranged to be under the fingertips of the user's other hand. As has been previously described, the set of first control keys 120" comprises five keys 122, 124, 126, 128 and 130, each of which may be identified by different colors. The set of first character keys 220' comprise five character keys 222, 224, 226, 228 and 230. As described previously, each of the character keys 222, 224, 226, 228 and 230 may carry character indicia representing a QWERTY compatible character set, as outlined in Table 2. Further, the cluster of keys defining the set of character keys 220' are arranged such that the user's arm will lie on an axis identical to that which has previously been described. However, the axis for the cluster of home keys operated by the user's left hand is different from that of the compact keyboard arrangement.

Figure 5:
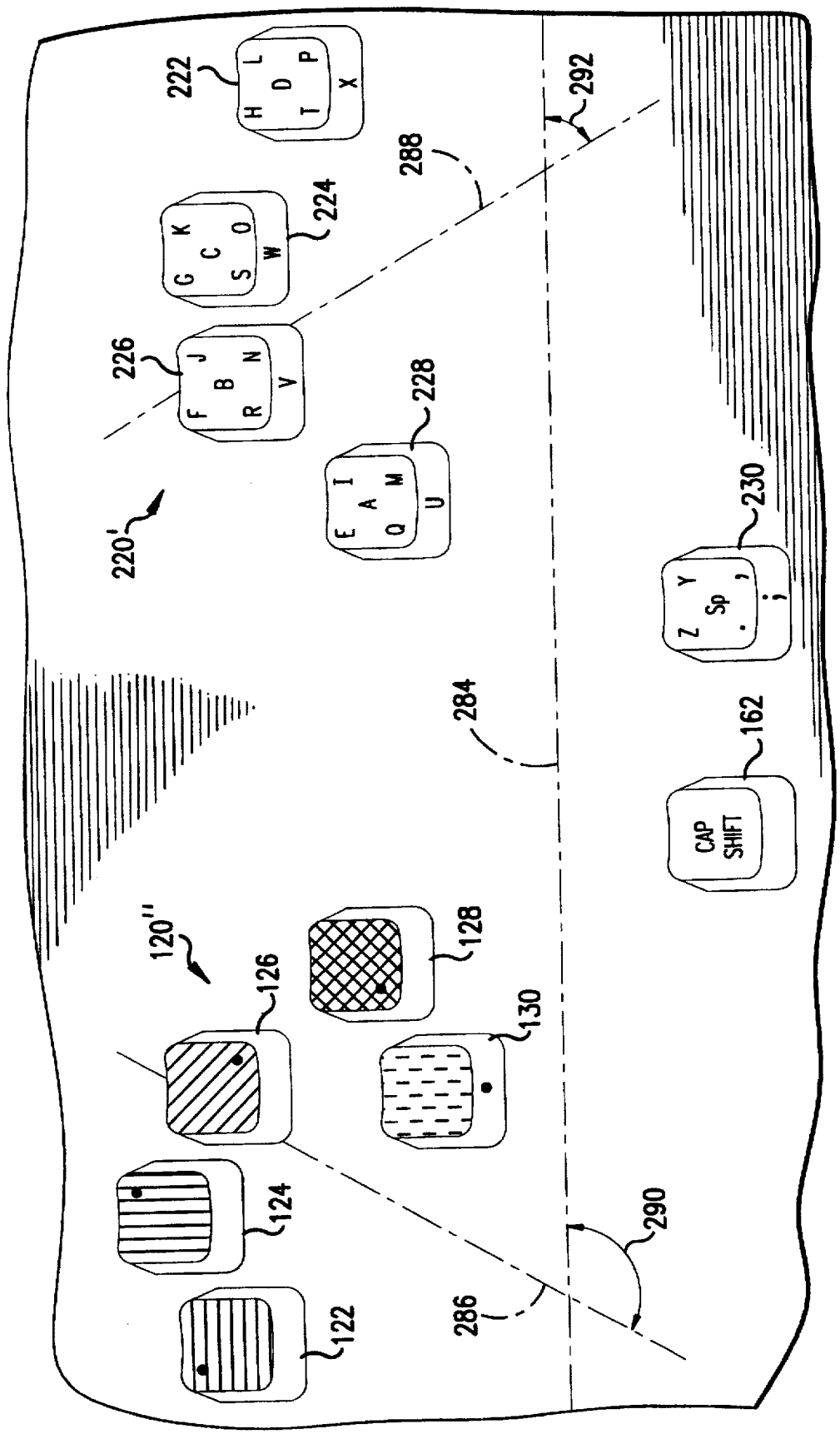

As shown in FIG. 5, the set of control keys 120 together with the CAP SHIFT key 162 are clustered about an axis line 286 which extends at an angle, identified by the directional arrow 290, with respect to the horizontal reference line 284 and represents the axis line of the user's arm. That angle of axis line 286 approximating 120°. The set of character keys 220 are clustered about an axis line 288 which extends at an angle, indicated by the directional arrow 292, with respect to the horizontal reference line 284. The angle of axis line 288 approximates 60°, which is the complement of the angle of the axis line 286. Thus, the axis lines 286 and 288 are each inclined by approximately the same angle, but in different directions.

Also shown in FIG. 5 is an alternate alphabetic character assignment for the multifunction character keys 220, 224, 226, 228 and 230. As shown in FIG. 5 and Table 4, the characters are alphabetically arranged in sequence between the character keys 228, 226, 224 and 222, with the last two remaining characters disposed on key 230.

TABLE 4

| | | Control key | | | | |
|---|---|---|---|---|---|---|
| CHAR. KEY | NONE | #1 BL | #2 RED | #3 GR | #4 OR | #5 PURPLE |
| 230 | SPACE | Z | Y | , | . | ; |
| 228 | A | E | I | M | Q | U |
| 226 | B | F | J | N | R | V |
| 224 | C | G | K | O | S | W |
| 222 | D | H | L | P | T | X |

The particular character arrangement provided in Table 4 may be more advantageous to some users than the arrangement shown in Table 3, where QWERTY compatibility is not desired. Irrespective of which alphabetic character set is utilized, the advantage provided by the described keyboard entry system 100', 100'' is the inclusion of a complete alphabet character set on the home keys, the keys that users initially place their fingers on. It is only for non-alphabetic symbols and computer-type functions or changes in case that require displacement of the user's fingers from the home keys. A substantial portion of text-type entry can be accomplished without displacement of the fingers from the home keys, providing a large increase in throughput.

The utility of the keyboard entry system is further enhanced by use of a particular assignment of characters to the set of first character keys, as outlined in Tables 1 and 2, providing QWERTY compatibility, and thereby making the keyboard easy to learn. Another advantage of the keyboard entry system described herein is the ability to construct a compact-sized keyboard utilizing full size standard keys. Such is accomplished by linearly displacing the set of first control keys relative to the set of first character keys, and rotating the configuration of the control keys which make up the set of first control keys to have an axis which is angled differently than the axis of the configuration of character keys which make up the set of first character keys. The particular angle is both different and non-complementary to the angle of the axis line for the set of first character keys.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. An ergonomic keyboard entry system, comprising:
   a longitudinally extended base;
   a plurality of multifunction character keys coupled to said base, said plurality of multifunction character keys including a set of six or less first multifunction character keys, five of said set of first multifunction character keys being irregularly arranged on said base to be located under finger tips of a first bent human hand, said irregular arrangement of said five first multifunction character keys being disposed about a first axis extending at a first predetermined angle with respect to said longitudinal direction, each of said set of first multifunction character keys being operative to generate an alphabetic character output function; and,
   a plurality of control keys coupled to said base, said plurality of control keys including a set of five or less first control keys irregularly arranged on said base to be located under finger tips of a second bent human hand, said irregular arrangement of said set of first control keys being disposed about a second axis extending at a second predetermined angle with respect to said longitudinal direction, each of said set of first control keys being operative to generate a predetermined assignment of output functions to said plurality of multifunction character keys, each of said plurality of multifunction character keys designates a base character output function responsive to an absence of simultaneous operation of any of said set of first control keys, at least a portion of said plurality of multifunction character keys designate at least four alternate character output functions responsive to operation of a respective one of said first control keys simultaneous therewith for each said alternate character output function, each of said set of first control keys having an indicia indication disposed at a predetermined position thereon, said predetermined position being different for each of said set of first control keys.

2. The ergonomic keyboard entry system as recited in claim 1 where each of said portion of said plurality of multifunction character keys has indicia formed thereon representing said base character and said alternate characters, each of said alternate character indicia being located at a position corresponding to a position of a respective one of said indicia indications of said set of first control keys to indicate which of said character output functions are generated with the simultaneous actuation of said multifunction character key and a respective one of said set of first control keys.

3. An ergonomic keyboard entry system, comprising:
   a longitudinally extended base;
   a plurality of multifunction character keys coupled to said base, said plurality of multifunction character keys including a set of six or less first multifunction character keys, five of said set of first multifunction character keys being irregularly arranged on said base to be located under finger tips of a first bent human hand, said irregular arrangement of said five first multifunction character keys being disposed about a first axis extending at a first predetermined angle with respect to said longitudinal direction, each of said set of first multifunction character keys being operative to generate an alphabetic character output function; and,
   a plurality of control keys coupled to said base, said plurality of control keys including a set of five or less first control keys irregularly arranged on said base to be located under finger tips of a second bent human hand, said irregular arrangement of said set of first control keys being disposed about a second axis extending at a second predetermined angle with respect to said longitudinal direction, each of said set of first control keys being operative to generate a predetermined assignment of output functions to said plurality of multifunction character keys, each of said plurality of multifunction character keys designates a base character output function responsive to an absence of simultaneous operation of any of said set of first control keys, at least a portion of said plurality of multifunction character keys designate at least five alternate character output functions responsive to operation of a respective one of said set of first control keys simultaneous therewith for each said alternate character output function, each of said set of first control keys having an indicia indication disposed at a predetermined position thereon, said predetermined position being different for each of said set of first control keys.

4. The ergonomic keyboard entry system as recited in claim 3 where each of said portion of said plurality of multifunction character keys has indicia formed thereon representing said base character and said alternate characters, each of said alternate character indicia being located at a position corresponding to a position of a respective one of said indicia indications of said set of first control keys to indicate which of said character output functions are generated with the simultaneous actuation of said multifunction character key and a respective one of said set of first control keys.

5. The ergonomic keyboard entry system as recited in claim 4 where said set of first multifunction character keys includes a sixth character key located to one side of said fourth character key for generating output functions representing at least the alphabetic characters F, H, M, V, and Y.

6. An ergonomic keyboard entry system, comprising:

a longitudinally extended base;

a plurality of multifunction character keys coupled to said base, said plurality of multifunction character keys including a set of six or less first multifunction character keys, five of said set of first multifunction character keys being irregularly arranged on said base to be located under finger tips of a first bent human hand, said irregular arrangement of said five first multifunction character keys being disposed about a first axis extending at a first predetermined angle with respect to said longitudinal direction, each of said set of first multifunction character keys being operative to generate an alphabetic character output function, said set of first multifunction character keys including:

a first character key located under a user's fifth finger tip of the first hand for generating output functions representing at least the alphabetic characters A, G, P, Q, and Z;

a second character key located under the user's fourth finger tip of the first hand for generating output functions representing at least the alphabetic characters L, O, S, W, and X;

a third character key located under the user's third finger tip of the first hand for generating output functions representing at least the alphabetic characters C, D, E, I, and K;

a fourth character key located under the user's second finger tip of the first hand for generating output functions representing at least the alphabetic characters J, N, R, T, and U; and, a fifth character key located under the user's first finger tip of the first hand for generating output functions representing at least the alphabetic character B and a SPACE function; and, a plurality of control keys coupled to said base, said plurality of control keys including a set of five or less first control keys irregularly arranged on said base to be located under finger tips of a second bent human hand, said irregular arrangement of said set of first control keys being disposed about a second axis extending at a second predetermined angle with respect to said longitudinal direction, each of said set of first control keys being operative to generate a predetermined assignment of output functions to said plurality of multifunction character keys.

7. An ergonomic keyboard entry system, comprising:

a base;

a plurality of multifunction character keys coupled to said base, said plurality of multifunction character keys including:

a. a first character key positionally located to be operable by a user's fifth finger of one hand for generating output functions representing at least the alphabetic characters A, G, P, Q, and Z;

b. a second character key positionally located to be operated by a user's fourth finger of one hand for generating output functions representing at least the alphabetic characters L, O, S, W, and X;

c. a third character key positionally located to be operated by a user's third finger of one hand for generating output functions representing at least the alphabetic characters C, D, E, I, and K;

d. a fourth character key positionally located to be operated by a user's second finger of one hand for generating output functions representing at least the alphabetic characters J, N, R, T, and U;

e. a fifth character key positionally located to be operated by a user's first finger tip of one hand for generating output functions representing at least the alphabetic character B and a SPACE function; and, f. a plurality of control keys coupled to said base, said plurality of control keys including a plurality of character selection keys, each of said character selection keys being operative to assign a selected alphabetic output function to said first, second, third, fourth and fifth character keys.

* * * * *